United States Patent
Urmanov et al.

(10) Patent No.: US 8,000,839 B2
(45) Date of Patent: Aug. 16, 2011

(54) METHOD AND APPARATUS FOR ACTIVELY CANCELING VIBRATIONS IN A COMPUTER SYSTEM

(75) Inventors: Aleksey M. Urmanov, San Diego, CA (US); Anton A. Bougaev, La Jolla, CA (US); Kenny C. Gross, San Diego, CA (US); Andrew J. Lewis, Litchfield, NH (US)

(73) Assignee: Oracle America, Inc., Redwood Shores, CA (US)

( * ) Notice: Subject to any disclaimer, the term of this patent is extended or adjusted under 35 U.S.C. 154(b) by 278 days.

(21) Appl. No.: 12/025,127

(22) Filed: Feb. 4, 2008

(65) Prior Publication Data
US 2009/0195922 A1 Aug. 6, 2009

(51) Int. Cl.
*G05B 21/00* (2006.01)
*F16F 15/00* (2006.01)
*G10K 11/16* (2006.01)
*F16D 65/14* (2006.01)

(52) U.S. Cl. .................. 700/280; 381/71.1; 188/73.36

(58) Field of Classification Search .................. 700/280; 381/71.1; 188/73.36; 702/56
See application file for complete search history.

(56) References Cited

U.S. PATENT DOCUMENTS

| | | | |
|---|---|---|---|
| 5,596,931 A * | 1/1997 | Rossler et al. | 101/484 |
| 6,047,794 A * | 4/2000 | Nishizawa | 188/73.36 |
| 6,950,727 B2 * | 9/2005 | Ichikawa | 700/280 |
| 2007/0178942 A1 * | 8/2007 | Sadler et al. | 455/567 |

OTHER PUBLICATIONS

N. Tandon, "Vibration monitoring of computer hard disk drives ", Mechanical Systems and Signal Processing 20 (2006) 1008-1013.*

* cited by examiner

*Primary Examiner* — Ramesh B Patel
*Assistant Examiner* — Sivalingam Sivanesan
(74) *Attorney, Agent, or Firm* — Park, Vaughan, Fleming & Dowler LLP

(57) ABSTRACT

One embodiment of the present invention provides a system actively cancels vibrations in a computer system. During operation, the system monitors vibrations in the computer system. Next, the system analyzes the vibrations to identify one or more harmonics in the vibrations. The system then actively cancels one or more of the identified harmonics.

15 Claims, 2 Drawing Sheets

METHOD AND APPARATUS FOR ACTIVELY CANCELING VIBRATIONS IN A COMPUTER SYSTEM

BACKGROUND

1. Field of the Invention

Embodiments of the present invention relate to techniques for improving the vibrational health of computer systems. More specifically, the present invention relates to a method and an apparatus that actively cancels vibrations that affect the performance of components, such as hard disk drives (HDDs), within a computer system.

2. Related Art

Computer systems such as servers and storage arrays can be adversely affected by mechanical vibrations that affect internal computer system components and structures. In particular, when structural resonances are present in servers or storage arrays at some characteristic frequencies, it is possible that cooling fans or disk drives operate at rotational frequencies that are substantially the same as one of the structural resonant frequencies. When this condition occurs, the rotational motions of the fans or the disk drives can excite a structural resonance within the computer system's mechanical structure, thereby causing destructive amplification of internal vibrations. The amplified internal vibrations can subsequently lead to degradation of throughput associated with hard disk drives (HDDs), and can also accelerate other mechanical failure mechanisms.

Note that the above-described vibrational problems are becoming more significant because of the following trends in computer system manufacturing: (1) cooling fans are becoming increasingly more powerful; (2) chassis and support structures are becoming weaker because of design modifications that reduce cost and weight; and (3) internal disk drives, power supplies, and other system components are becoming more sensitive to vibration-induced degradation.

At the same time, HDDs are becoming more sensitive to vibrations because the storage density for HDDs has increased to the point where a write head has to align with a track which is less than 20 nanometers wide. Moreover, the write head floats only 7 nanometers above the disk surface. These extremely small dimensions make the read and write performance of the HDDs extremely sensitive to vibrations. Even low levels of sustained vibrations can significantly deteriorate I/O performance of the HDDs.

A "brute force" approach to decouple externally generated vibrations from the HDDs involves: (1) identifying HDDs which are adversely affected by the vibrations; (2) identifying the vibration sources; and (3) inserting rubber or foam dampers, grommets, or stiffeners in available spaces around identified vibration sources and vibration-sensitive HDDs in an effort to isolate these components from the rest of the computer system. However, using elastomeric dampers/stiffeners and grommets is undesirable because these materials are known to deteriorate with time. Moreover, the above-described approach can be very costly and inefficient in practice.

Hence, what is needed is a method and an apparatus that facilitates mitigating vibration problems for HDDs without the above-described problems.

SUMMARY

One embodiment of the present invention provides a system actively cancels vibrations in a computer system. During operation, the system monitors vibrations in the computer system. Next, the system analyzes the vibrations to identify one or more harmonics in the vibrations. The system then actively cancels one or more of the identified harmonics.

In a variation on this embodiment, actively canceling the identified harmonics involves using a mechanical transducer to actively cancel the identified harmonics.

In a further variation on this embodiment, the mechanical transducer is an offset-mass motor.

In a further variation on this embodiment, using the mechanical transducer to actively cancel the identified harmonics involves using multiple mechanical transducers to cancel multiple identified harmonics.

In a further variation on this embodiment, using the mechanical transducer to actively cancel an identified harmonic involves adjusting a frequency of a canceling vibration from the mechanical transducer so that the frequency of the canceling vibration substantially matches the frequency of the identified harmonic.

In a further variation on this embodiment, using the mechanical transducer to actively cancel an identified harmonic involves adjusting a phase of a canceling vibration from the mechanical transducer so that the canceling vibration is substantially opposite in phase to the identified harmonic.

In a further variation on this embodiment, using the mechanical transducer to actively cancel an identified harmonic involves adjusting an amplitude of a canceling vibration from the mechanical transducer so that the amplitude of the canceling vibration substantially matches the amplitude of the identified harmonic.

In a variation on this embodiment, identifying the one or more harmonics involves identifying one or more harmonics within a frequency range which affects hard disk drive performance.

In a variation on this embodiment, analyzing the vibrations to identify the one or more harmonics involves performing a Fast Fourier Transform on the vibrations.

In a variation on this embodiment, the mechanical transducer is coupled to a hard drive in the computer system so that the mechanical transducer cancels vibrations at the hard drive.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
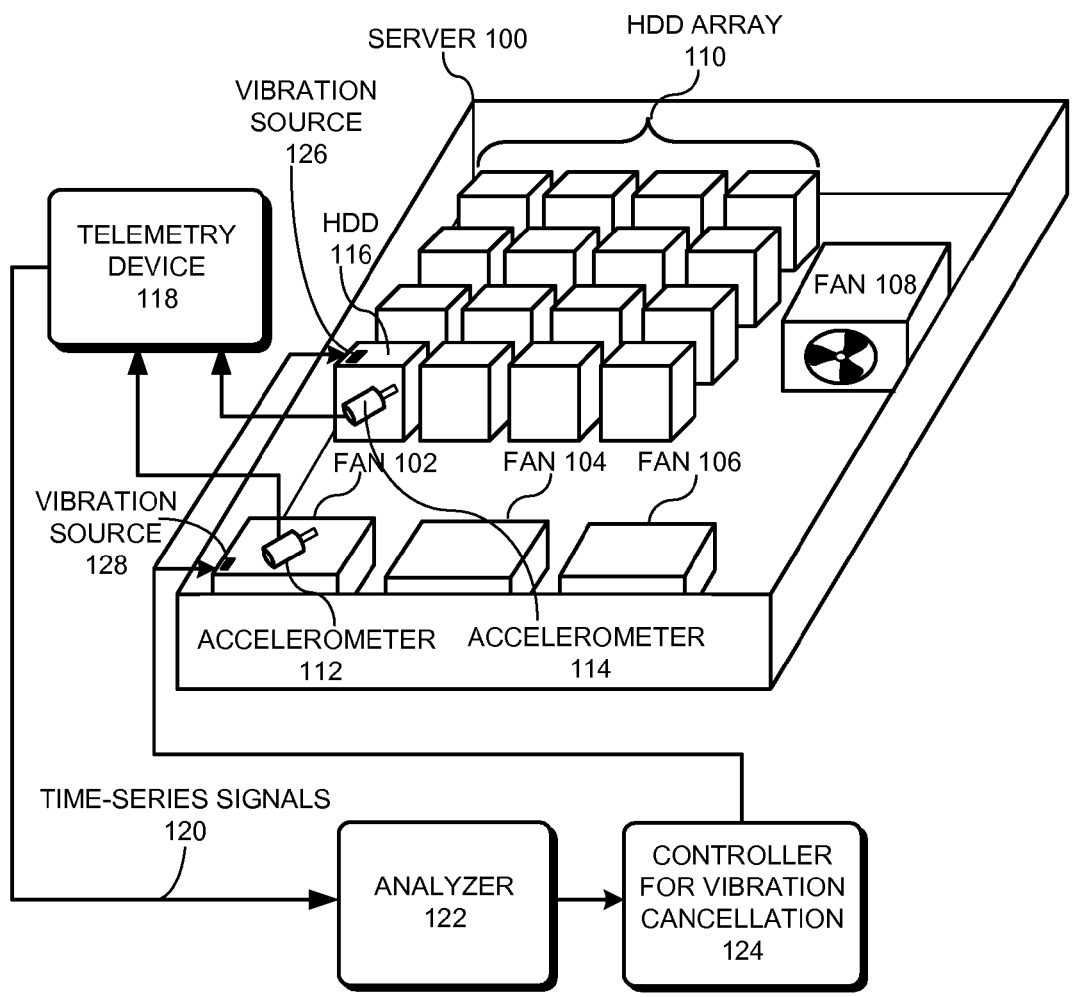
FIG. 1 illustrates a computer system in accordance with an embodiment of the present invention.

FIG. 1 illustrates a server 100 that includes multiple fans and multiple HDDs in accordance with an embodiment of the present invention. More specifically, server 100 includes a number of cooling fans, i.e., fan 102, fan 104, fan 106, and fan 108. These cooling fans are deployed to increase air circulation around heat-generating components in server 100 and to pump heat out of server 100. Such heat-generating components can include: the CPU, memory modules, the power supply, and hard disk drives (HDDs). Hence, fans 102-108 may be placed at different locations inside server 100. Note that although server 100 is used for the purposes of illustration, embodiments of the present invention can be applied to other computer systems, such as desktop computers, workstations, storage arrays, embedded computer systems, automated manufacturing systems, and other computer systems which use one or more cooling fans for system cooling.

Server 100 also includes an HDD array 110, wherein one or more of the HDDs in HDD array 110 are sensitive to mechanical vibrations within server 100. Note that although we show one HDD array in FIG. 1, some computer systems can include more than one HDD array, while other computer systems can include one or more HDDs which are not necessarily configured as an array. Note that mechanical coupling can exist between each of fans 102-108 and a given HDD in HDD array 110. Furthermore, mechanical coupling can exist between a pair of HDDs in HDD array 110.

As cooling fans become increasingly more powerful, they can create a significant amount of mechanical vibrations in the computer system. In the following discussion, we use terms "vibration" and "mechanical vibration" interchangeably. We also use the term "fan speed" to refer to the rotation frequency of a fan. Note that because fan blades rotate at a constant rotational speed in terms of rotations per minute (RPM), this RPM value gives rise to a corresponding frequency component in an associated vibration spectrum (in Hz). For example, a fan speed of 6000 RPM creates a mechanical vibration containing a frequency component of (6000 RPM)/(60 sec)=100 Hz. Note that other frequency components can exist in the vibrational spectrum which are also associated with the fan operation. These frequency components can include, but are not limited to, harmonics (e.g., 1×, 2×, 3×, 4×, etc.) of the primary frequency, and beat frequencies created by slightly different speeds between fans in the set of fans.

Referring back to FIG. 1, server 100 includes an accelerometer 112 placed on or integrated with fan 102. Accelerometer 112 can be used to detect mechanical vibrations produced by fan 102. Specifically, accelerometer 112 is configured to pick up vibration signals associated with fan 102, wherein the vibration signals contain information on the fan speed (in RPM). The accelerometer can then produce an electrical signal that replicates the vibration signals from the fan.

Server 100 also includes another accelerometer 114 which is placed on or is integrated with HDD 116. Accelerometer 114 can be used to detect mechanical vibrations associated with HDD 116. Specifically, accelerometer 114 is configured to pick up vibration signals associated with HDD 116, wherein the vibration signals contain information about the spindle rotation speed (in RPM) of HDD 116. The accelerometer can then produce an electrical signal that replicates the vibration signals associated with the HDD.

Note that although we show accelerometers being placed on a particular fan 102 and on a particular HDD 116, accelerometers can generally be placed at any location in server 100 to monitor vibrations. In some embodiments of the present invention, other components in server 100 that are to be protected from destructively amplified resonance vibrations also include accelerometers. For example, other disk drives, peripheral boards, system board components, tape drives, ASICs, mounting brackets, and other components in the system may include one or more accelerometers. Note that some commercial off-the-shelf (COTS) HDDs are already being manufactured with one or two internal accelerometers which can be used to measure the vibration experienced by the HDDs. Also note that the present invention is applicable to a computer system equipped with any number of fans and any number of HDDs. Hence, the present invention is not limited to the particular configuration illustrated in FIG. 1.

The outputs from accelerometers 112 and 114 are coupled to a telemetry device 118, which is capable of gathering electrical signals produced by the accelerometers and generating time-series signals 120. In one embodiment of the present invention, telemetry device 118 is part of a Continuous System Telemetry Harness (CSTH), which provides real-time outputs for the instrumentation signals. Note that these instrumentation signals can include other signals associated with physical performance parameters measured through sensors within the computer system. For example, the physical parameters can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

Telemetry device 118 directs time-series signals 120 to a local or a remote location that contains an analyzer 122. Analyzer 122 is configured to identify harmonics in the vibration signals received from accelerometers 112 and 114. More specifically, in one embodiment of the present invention, analyzer 122 is configured to identify the three most significant harmonics in the frequency range known to affect HDD performance (nominally from 300 to 600 Hz in the preferred embodiment). This analysis operation can involve, for example, performing a Fast Fourier Transform (FFT) on the vibration signals from accelerometers 112 and 114 to convert the vibration signals into the frequency domain. A number peaks of the highest amplitude in the frequency domain can then be identified as the most-significant harmonics.

The output of analyzer 122 feeds into controller 124, which controls active vibration sources 126 and 128 to effectively reduce or eliminate the identified harmonics. For example, in FIG. 1 vibration source 128 is coupled to fan 102 and vibration source 126 is coupled to HDD 166.

One embodiment of the present invention uses very low cost vibration sources to cancel the principal offending harmonics and provide mechanical stability assurance throughout the life of the server. More specifically, server 100 includes vibration sources 126 and 128, which are transducers that accept an input signal and output mechanical vibrations. In some embodiments of the present invention, vibration sources 126 and 128 are Commercial-Off-The-Shelf (COTS) vibrators, such as the vibrators used in cell phones. In some embodiments, the frequency of the mechanical vibrations can be varied according to the magnitude of an input voltage.

Possible configurations for the accelerometers and vibration sources are described in more detail below with reference to FIG. 2.

Disk Drive with Attached Accelerometers and Shakers

Figure 2:
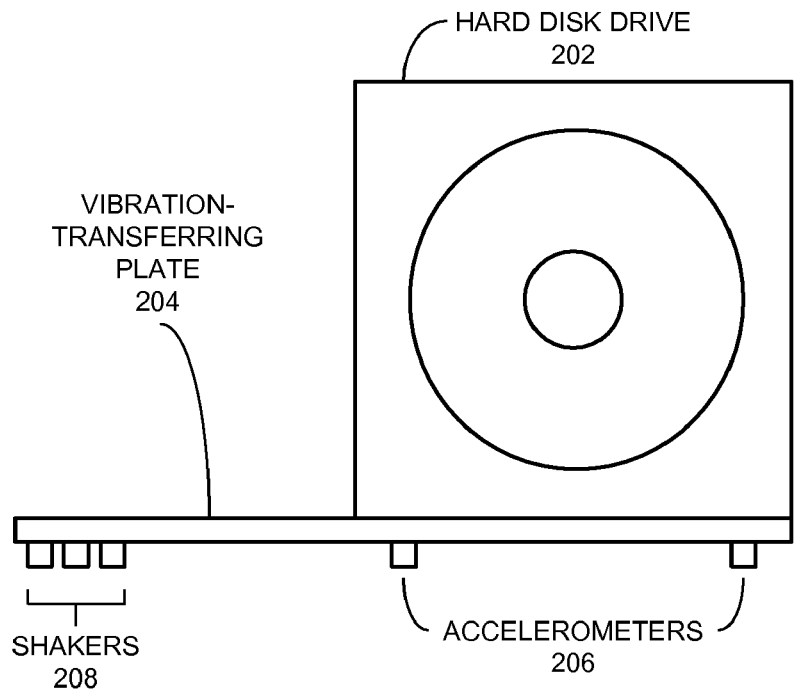
FIG. 2 illustrates a disk drive with attached accelerometers and shakers in accordance with an embodiment of the present invention.

FIG. 2 illustrates a disk drive with attached accelerometers and shakers in accordance with an embodiment of the present invention. In the embodiment illustrated in FIG. 2, the housing of a hard disk drive (HDD) 202 within a computer system is coupled to a vibration transferring plate 204. Vibration-transferring plate 204 is itself coupled to three vibration sources (which are implemented as shakers 208) and two vibration sensors (which are implemented as translational accelerometers 206).

In one embodiment of the present invention, the three shakers 208 comprise three tiny offset-mass motors which are rigidly affixed to the housing structure holding one or more hard disk drives (HDD). Note that three vibration sources are used in one embodiment of the present invention because it has been empirically verified that canceling the three highest harmonics in the sensitive frequency range for HDDs generally results in satisfactory throughput performance from HDDs.

Also note that the cost of the tiny vibrational stimulus generator motors shown in the FIGS. 1 and 2 is quite modest and the devices are known to be easily manufacturable in very large quantities. For example, the vibrator can be a standard COTS vibrator deployed in over a billion cell phones; the only modification for our new application is a variable-voltage control algorithm that matches the frequency of each of N vibrators to the N highest harmonics in the vibrational spectrum that is most deleterious to HDD throughput.

Voltage to the offset-mass motors is controlled so that the three motors run at the same frequency, but 180 degrees out of phase with respect to the three corresponding highest harmonics in the internal vibrational profile for the server. The phase of the motors can be actively controlled to be 180-degrees out of phase through a number of well-known techniques. For example, the phase can be adjusted by temporarily increasing or decreasing the voltage applied to the offset-mass motors. Moreover, this phase-adjustment can be actively controlled to cancel vibrations through a standard feedback-control technique which varies the phase of an offset-mass motor and then measures the resulting cancellation. Note that machine-learning technique can be used during this feedback-control process to learn how an adjustment in phase affects the resulting vibration cancellation.

Moreover, the amplitude of the vibrations from these COTS vibrators can be matched to the amplitude of the harmonics by providing offset-mass motors with different masses, and then associating a specific harmonic with a specific mass that matches the magnitude of the specific harmonic. For example, the amplitude of vibrations from standard tiny cell-phone vibrators has been empirically shown to be more than sufficient for active stabilization of HDD housing structures even in high-end servers as large as a refrigerator.

Vibration Cancellation Process

Figure 3:
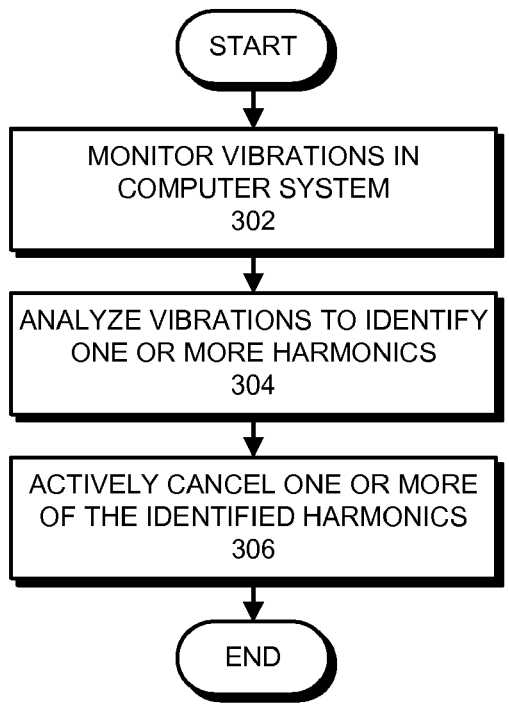
FIG. 3 presents a flowchart illustrating the process of active vibration cancellation.

FIG. 3 presents a flowchart illustrating the process of active vibration cancellation in a computer system. First, the system monitors vibrations in the computer system, for example through one or more translational accelerometers (step 302). Next, the system analyzes the vibrations to identify one or more harmonics in a frequency-domain profile for vibrations (step 304). As mentioned previously, this analysis process can involve performing an FFT to identify the harmonics. The system then actively cancels one or more of the identified harmonics using active transducers, such as offset-mass motors (step 306).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for actively canceling vibrations in a computer system, the method comprising:
 monitoring vibrations in the computer system;
 analyzing the vibrations to identify two or more harmonics in the vibrations that are within a frequency range which affects performance for a hard disk drive; and
 actively canceling two or more of the identified harmonics by using a mechanical transducer to actively cancel the two or more identified harmonics, wherein the mechanical transducer is coupled to the hard disk drive for the computer system so that the mechanical transducer cancels vibrations at the hard disk drive;
 wherein the mechanical transducer includes two or more offset-mass motors, each motor having a different offset mass, and wherein actively canceling each of the identified harmonics involves associating one of the offset-mass motors with each identified harmonic and actively canceling the harmonic using the associated offset-mass motor.

2. The method of claim 1, further comprising using one or more additional mechanical transducers to cancel multiple identified harmonics.

3. The method of claim 1, wherein using the mechanical transducer to actively cancel an identified harmonic involves adjusting a frequency of a canceling vibration from the mechanical transducer so that the frequency of the canceling vibration substantially matches the frequency of the identified harmonic.

4. The method of claim 1, wherein using the mechanical transducer to actively cancel an identified harmonic involves adjusting a phase of a canceling vibration from the mechanical transducer so that the canceling vibration is substantially opposite in phase to the identified harmonic.

5. The method of claim 1, wherein using the mechanical transducer to actively cancel an identified harmonic involves adjusting an amplitude of a canceling vibration from the mechanical transducer so that the amplitude of the canceling vibration substantially matches the amplitude of the identified harmonic.

6. The method of claim 1, wherein analyzing the vibrations to identify the two or more harmonics involves performing a Fast Fourier Transform on the vibrations.

7. The method of claim 1, wherein coupling the mechanical transducer to the hard disk drive involves affixing the mechanical transducer to a housing structure for the hard disk drive.

8. The method of claim 1, wherein associating one of the offset-mass motors with each identified harmonic comprises:
 determining a magnitude of each harmonic; and
 matching a different offset-mass motor from the two or more offset-mass motors with each harmonic in accordance with the magnitude of the harmonic.

9. An apparatus that actively cancels vibrations in a computer system, the apparatus comprising:

a monitoring mechanism configured to monitor vibrations in the computer system;

an analyzing mechanism configured to analyze the vibrations to identify two or more harmonics in the vibrations that are within a frequency range which affects performance for a hard disk drive; and a vibration-cancellation mechanism configured to actively cancel two or more of the identified harmonics by using a mechanical transducer to actively cancel the two or more identified harmonics, wherein the mechanical transducer is coupled to the hard disk drive for the computer system so that the mechanical transducer cancels vibrations at the hard disk drive wherein the mechanical transducer includes two or more offset-mass motors, each motor having a different offset mass, and wherein when actively canceling each of the identified harmonics, the vibration-cancelling mechanism is configured to associate one of the offset-mass motors with each identified harmonic and actively cancel the harmonic using the associated offset-mass motor.

10. The apparatus of claim 9, wherein the vibration-cancellation mechanism is configured to use one or more additional mechanical transducers to cancel multiple identified harmonics.

11. The apparatus of claim 9, wherein the vibration-cancellation mechanism is configured to adjust a frequency of a canceling vibration so that the frequency of the canceling vibration substantially matches the frequency of the identified harmonic.

12. The apparatus of claim 9, wherein the vibration-cancellation mechanism is configured to adjust a phase of a canceling vibration so that the canceling vibration is substantially opposite in phase to the identified harmonic.

13. The apparatus of claim 9, wherein the vibration-cancellation mechanism is configured to adjust an amplitude of a canceling vibration so that the amplitude of the canceling vibration substantially matches the amplitude of the identified harmonic.

14. The apparatus of claim 9, wherein the analysis mechanism is configured to perform a Fast Fourier Transform on the vibrations.

15. A computer system that actively cancels vibrations, the computer system comprising:

a processor;

a memory;

a monitoring mechanism configured to monitor vibrations in the computer system;

an analyzing mechanism configured to analyze the vibrations to identify two or more harmonics in the vibrations that are within a frequency range which affects performance for a hard disk drive; and a vibration-cancellation mechanism configured to actively cancel two or more of the identified harmonics by using a mechanical transducer to actively cancel the two or more identified harmonics, wherein the mechanical transducer is coupled to the hard disk drive for the computer system so that the mechanical transducer cancels vibrations at the hard disk drive;

wherein the mechanical transducer includes two or more offset-mass motors, each motor having a different offset mass, and wherein when actively canceling each of the identified harmonics, the vibration-cancelling mechanism is configured to associate one of the offset-mass motors with each identified harmonic and actively cancel the harmonic using the associated offset-mass motor.

* * * * *